(12) United States Patent
MacDonald

(10) Patent No.: US 11,598,840 B1
(45) Date of Patent: Mar. 7, 2023

(54) SYSTEM AND PROCESS TO PASSIVELY DETERMINE THE 3-DIMENSIONAL POSITION, THE COURSE LINE AND THE SPEED OF A SIGNAL SOURCE

(71) Applicant: Raymond Milton MacDonald, Incline Village, NV (US)

(72) Inventor: Raymond Milton MacDonald, Incline Village, NV (US)

( * ) Notice: Subject to any disclaimer, the term of this patent is extended or adjusted under 35 U.S.C. 154(b) by 458 days.

(21) Appl. No.: 16/711,203

(22) Filed: Dec. 11, 2019

Related U.S. Application Data

(60) Provisional application No. 62/810,199, filed on Feb. 25, 2019.

(51) Int. Cl.
 *G01S 5/22* (2006.01)
 *G01S 5/16* (2006.01)

(52) U.S. Cl.
 CPC . *G01S 5/22* (2013.01); *G01S 5/16* (2013.01)

(58) Field of Classification Search
 CPC . G01S 15/931; G01S 5/00; G01S 1/80; G01S 5/0273; G01S 3/8006; G01S 19/44; G01S 3/86; G01S 15/876; G01S 3/8086; G01S 5/0036; G01S 7/003; G01S 11/14; G01S 5/30; G01S 3/808; G01S 5/22; G01S 5/18
 See application file for complete search history.

(56) References Cited

U.S. PATENT DOCUMENTS

| | | | | |
|---|---|---|---|---|
| 2002/0133148 A1* | 9/2002 | Daniel | ............... | A61B 18/1477 606/34 |
| 2009/0190775 A1* | 7/2009 | Reining | ................. | H04R 1/406 381/92 |
| 2011/0291527 A1* | 12/2011 | Lipson | ................... | H02N 2/185 310/339 |
| 2016/0331262 A1* | 11/2016 | Kuck | ...................... | A61N 7/022 |
| 2017/0164878 A1* | 6/2017 | Connor | ................... | G09B 19/00 |
| 2018/0068155 A1* | 3/2018 | Call | ........................ | A61B 8/485 |
| 2018/0186082 A1* | 7/2018 | Randhawa | ............. | B33Y 30/00 |
| 2021/0389439 A1* | 12/2021 | Sumi | ................... | G01S 7/52047 |

OTHER PUBLICATIONS

MacDonald Innovations, ShotMarker The electronic target for everyone (Year: 2022).*

* cited by examiner

*Primary Examiner* — Daniel L Murphy
*Assistant Examiner* — Amie M NDure
(74) *Attorney, Agent, or Firm* — Plager Schack LLP; Mark H. Plager; Alexis J. Saenz

(57) ABSTRACT

A system and process determine the 3-dimensional position, the course line and possibly the speed of an energy source. Embodiments use an antenna array system that includes receiver transducers positioned to form an equilateral triangle with a receiver transducer at each point of the triangle. Each transducer is independent, and there may be no electrical connection between each transducer in the antenna array. Each transducer may be connected directly to a computer for signal analysis to provide for case decision and display of the appropriate information and steps to follow to determine the appropriate action required by the computer operator. By detection of a single signal from a sound or light source, the 3-dimensional position and a course line of that signal source can be determined under certain circumstances.

4 Claims, 4 Drawing Sheets

SYSTEM AND PROCESS TO PASSIVELY DETERMINE THE 3-DIMENSIONAL POSITION, THE COURSE LINE AND THE SPEED OF A SIGNAL SOURCE

This application claims benefit to U.S. Provisional Patent Application 62/810,199, entitled "METHOD FOR DETERMINING THE 3-DIMENSIONAL POSITION, THE COURSE LINE AND POSSIBLY THE SPEED OF A SIGNAL SOURCE BY THE DETECTION OF A SINGLE SIGNAL FROM THAT SIGNAL SOURCE" filed Feb. 25, 2019. The U.S. Provisional Patent Application 62/810,199 is incorporated herein by reference.

BACKGROUND

The embodiments herein relate generally to source detection systems.

Conventional detection systems are configured to detect the two-dimensional position of an unknown object. Examples of current technologies include radio detection and ranging (RADAR) and sound navigation ranging (SONAR). In some cases, more than one signal from the source is needed to locate the source's position. Embodiments of the subject technology improve on the current techniques with better accuracy.

SUMMARY

In one aspect of the subject technology, a process for determining a three-dimensional position of an energy source by a plurality of transducers is disclosed. The process comprises: receiving, at a processor, an energy signal at two or more of the plurality of transducers positioned in a triangular arrangement; determining by the processor, an elapsed time difference of receiving the energy signal by the two or more transducers; determining by the processor, a case scenario for where the energy source is relative to the triangular arrangement based on the determined elapsed time difference; determining by the processor, a circle from a wave front of the energy signal; determining by the processor, a chord line in the circle, wherein one endpoint of the chord line is a position of one of the two or more transducers receiving the energy signal; determining by the processor, a magnitude of an angle relative to the chord and a first radius of the circle; and determining by the processor, a location of the energy source by determining a point perpendicular to a plane of the circle at a distance equal to the first radius and at the magnitude of the angle relative to the chord and the first radius.

In another aspect, a system for determining a three-dimensional position of an energy source by a plurality of transducers is disclosed. The system comprises: a plurality of receiving transducers; and a processor in communication with the plurality of receiving transducers, wherein the processor is configured to: receive, at the processor, an energy signal at two or more of the plurality of transducers positioned in a triangular arrangement; determine by the processor, an elapsed time difference of receiving the energy signal by the two or more transducers; determine by the processor, a case scenario for where the energy source is relative to the triangular arrangement based on the determined elapsed time difference; determine by the processor, a circle from a wave front of the energy signal; determine by the processor, a chord line in the circle, wherein one endpoint of the chord line is a position of one of the two or more transducers receiving the energy signal; determine by the processor, a magnitude of an angle relative to the chord and a first radius of the circle; and determine by the processor, a location of the energy source by determining a point perpendicular to a plane of the circle at a distance equal to the first radius and at the magnitude of the angle relative to the chord and the first radius.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
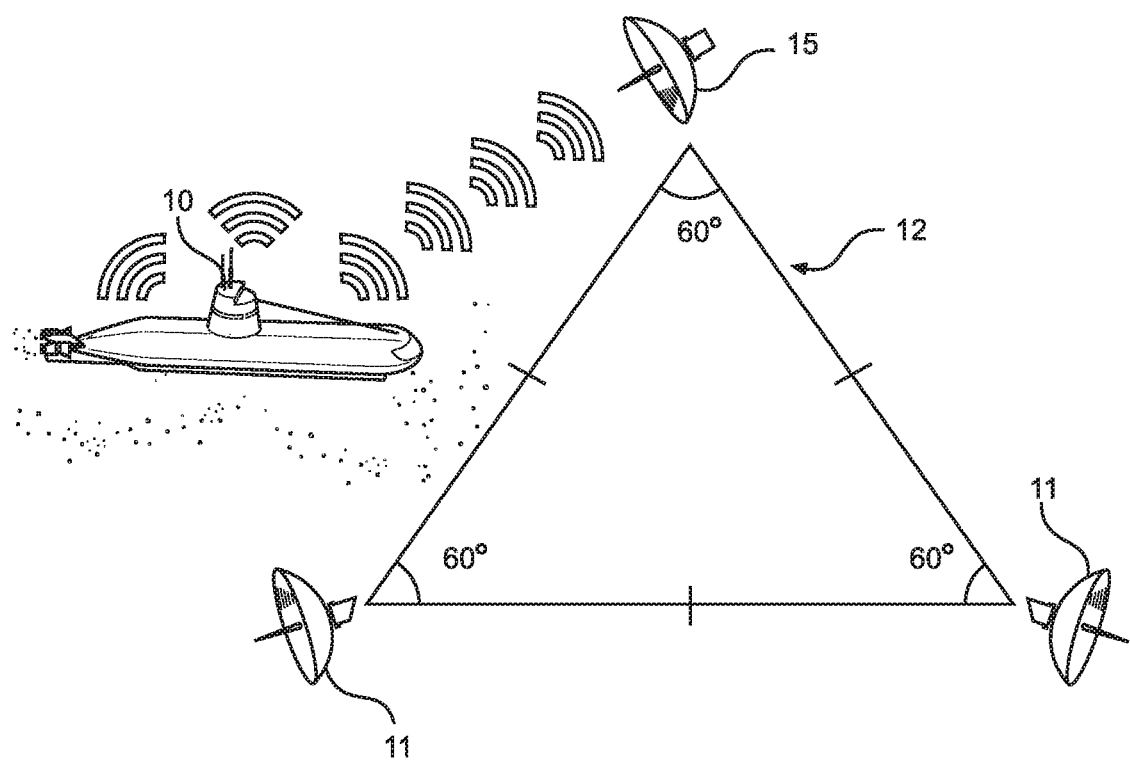
FIG. 1 is a schematic view of a system for determining the 3-dimensional position of a signal source according to an exemplary embodiment.

Referring to FIGS. 1-4, broadly, embodiments of the disclosed invention provide a system and process to determine the 3-dimensional position, the course line and possibly the speed of an energy source 10 by using an antenna array system 12 which in an exemplary embodiment, may include receiver transducers 11 positioned to form an equilateral triangle with a receiver transducer at each point of the triangle. As will be appreciated, sometimes only a single signal is needed to locate the source. Each transducer is independent, and there may be no electrical connection between each transducer in the antenna array. Each transducer may be connected directly to a computer for signal analysis to provide for case decision and display of the appropriate information and steps to follow to determine the appropriate action required by the computer operator. By detection of a single signal from a sound or light source 10, the 3-dimensional position and a course line of that signal source 10 can be determined under certain circumstances as explained in detail below. The determination of the speed of the energy source 10 may be determined by a separate antenna array, or possibly by the passage of the signal source 10 by the 1st transducer 11 activated using doppler frequency change. The detection of a signal from a sound source 10 by one transducer 11 in the array will result in 5 different outcomes depending on how many of the other two transducers 11 are subsequently activated. In 3 of the 5 cases, specifically in cases 1 and 2, if two transducers 11 in the array 12 are activated, then the signal source's 3-dimensional position, its course line, and possibly the speed of the energy source 10 can be determined. If all three transducers 11 are activated, specifically case 4, then the signal source's 3-dimensional position, its course line, and possibly the speed of the energy source, can be determined.

In Case 4 if three transducers 11 are activated then the position of the signal source may be either inside or outside the antenna array 12, or either above the antenna array or below the antenna array. In case 3 when two transducers 11 are activated, the 3-dimensional position and a course line of that signal source 10 may not be determined, but a Line of Position (LOP), can be determined. The determination of the speed of the energy source 10 may be determined by a separate antenna array, or possibly by the passage of the signal source by the 1st transducer 11 activated using doppler frequency change.

In Case 5, only one transducer 11 is activated, then the sound source's 3-dimensional position, its course, and speed cannot be determined, but the sound source can be narrowed down to the two adjacent sectors to the activated transducer.14.

Figure 2:
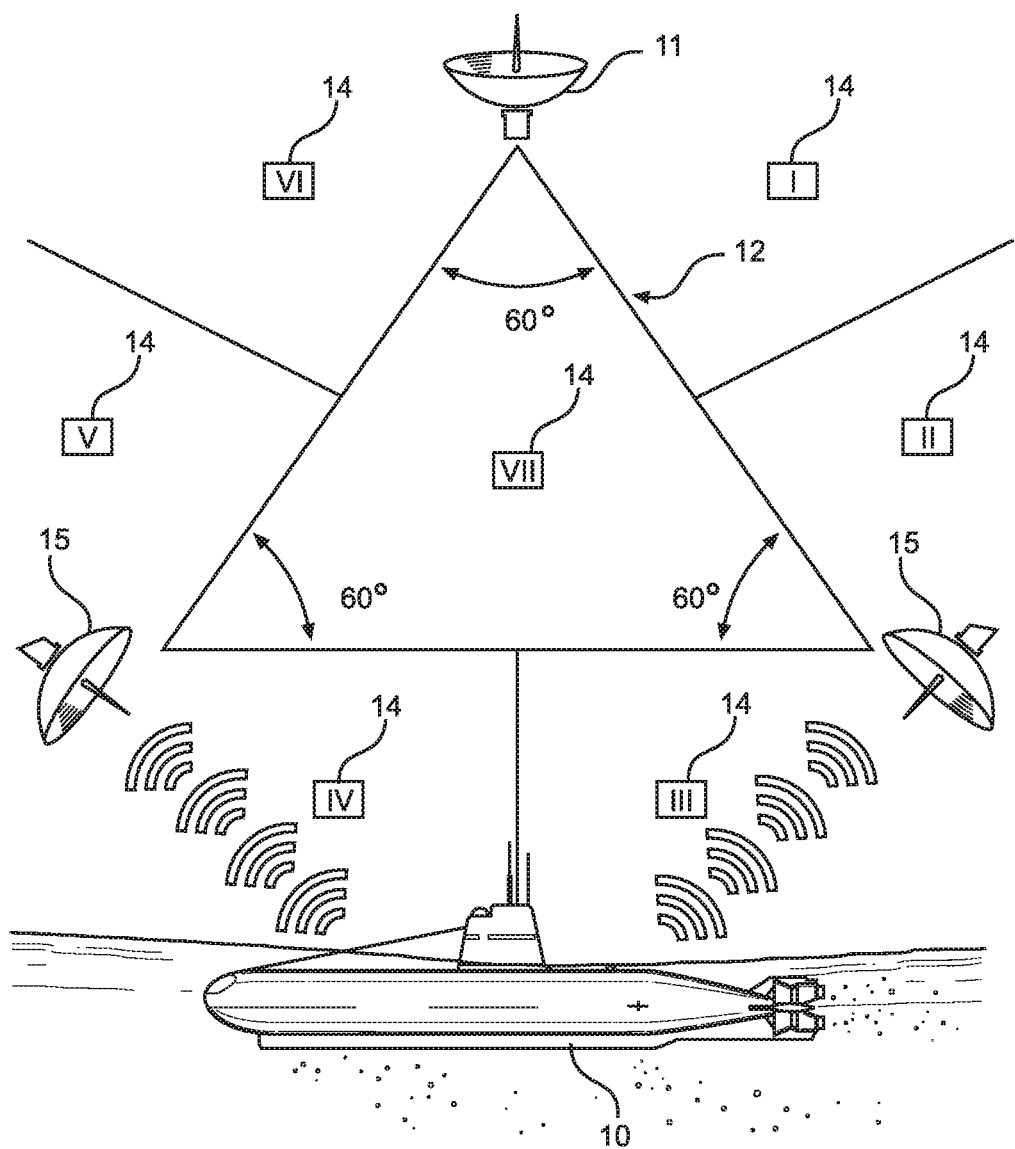
FIG. 2 is a schematic view showing sectors to identify the 3-dimensional position of a signal source according to an exemplary embodiment.

The sectors referenced in the following description of the triangle are designated in Roman numerals I through VII, as shown in FIG. 2. Furthermore, as will be seen, the transducer (s) detecting the energy source may be designated by reference numeral 15 for the convenience of the reader to follow which transducers 11 are being referenced in the calculations and scenarios described below. In addition, while the energy source 10 is shown as a submarine to illustrate a particular application, it will be understood that other energy sources may be detected and applications of the embodiments discussed herein may also be used on land, in air, and in outer space.

The parameter, L, is defined as the length of the distance between 2 transducers that represent one side of the equilateral triangle and forms one leg of the triangle that connects 2 transducers in the antenna array. There are 3 L,s in each XY plane in the triangle and 2 L,s in the vertical triangle that form the XZ and YZ planes in the antenna array. The speed of an energy signal that can travel through the medium whose length is L is labeled V and varies depending on the medium, i.e. the nominal speed of sound in seawater is 1531 meters per second. If 2 transducers are activated, the elapsed time between them is measured in seconds and is represented by the symbol, T. Therefore, in an equilateral triangle L is a constant length for all transducer pairs in an array and is computed by:

$$L=T*V. \quad \text{equation (1):}$$

The variable l is introduced and is measured along the constant L by equation (2) and l overlays on top of the length L. There are 3 l,s in each XY plane in the triangle and 2 l,s in the vertical triangle that form the XZ and YZ planes in the antenna array. The variable t is a variable parameter of time that is measured from the time that it takes for the 2nd transducer to be activated after the 1st transducer is activated. The variable t is different from T because the position of the starting point of the sound source is located at a different point on L, the triangle's leg. The variable t is be used to calculate the length of the variable l, which is needed to determine both the 2-dimensional position or the 3-dimensional positions of the energy source, or both and also the course line of that energy source. It's magnitude must be in the range 0<t<=T. When a transducer pair is activated and 0<t<=T, then t can be used to determine the length of l using equation (2). When l's length is known, then the $2^{nd}$ point on L is known and a circle can be determined in the following manner. The $2^{nd}$ point on L is established by measuring l backwards from the $2^{nd}$ transducer activated along length L. The endpoint of l will identify a position on L that will mark the $2^{nd}$ position on the circumference of the circle that is used to establish an arc between the 1st transducer activated and position on L that marks the $2^{nd}$ position on the circumference of the circle. Next fit a complete circle to the arc. The $1^{st}$ position of the arc is the position of the 1st transducer activated. The span of the length from the endpoint of l to the position of the 1st transducer activated can be calculated by the equation (7). The results of equation (7) is the measurement of the chord, C, used to determine the objectives of this paper.

$$l=t*V \quad \text{equation (2):}$$

$$C=L-l \quad \text{equation (7):}$$

The results of equation (7) is the measurement of the chord, C, used to determine objectives of this paper.

FIG. 1 shows that in all Cases, except Case 2, the 1st transducer activated is the one that is nearest to the sound source 10, followed by one of the two remaining transducers 11, and possibly the 3rd. Signal detection by the third transducer may not be necessary to determine the position and course line of the sound source.

The first transducer activated will narrow the sound source to two possible sectors adjacent to each other at the position of the 1st transducer activated. The activation of the second transducer by the same signal will narrow the sound source's position to one sector and the exact 3-dimensional position and the course line can be determined as described below in cases 1, 2, and 4.

The possible determination of the speed of the energy source is by the addition of another array at, or near the of the intersection and adjacent to the position of the new array, or possibly by the passage of the signal source by the 1st transducer activated using doppler frequency change. For the sake of illustration, only a single array 12 is shown in the various figures however, it will be understood that a plurality of arrays 12 may be positioned adjacent to each other and whose combined output signals may be used to determine the speed of the source 10. In addition, it will be understood that a computer processor may be in communication with each of the transducers and the process steps performed for calculating the position of the energy source may be performed by the processor.

The 5 Cases are explained below:

Cases 1 and 4. If the elapsed time of t is 0<t<T, then the sound source is neither on the line that is perpendicular to the triangle's leg and also at the mid-point of that leg as shown in FIG. 2 and is the line that separates the 2 sectors, nor is it on the extension of the line connecting the transducer pair, but somewhere in the sector enclosed by the boundaries that are formed by the imaginary perpendicular line at the midpoint of the line between the first and second transducer, and the extended line away from the triangle in the direction away from the $1^{st}$ transducer activated. In Cases 1, and 4, the position of the sound source and the course line of the sound source, can be solved using the process described below beginning at step 1 and skipping step 2.

Case 2. If both transducers in the transducer pair are activated simultaneously, then t=0 and the sound source is on the LOP that is perpendicular to and whose origin is at the midpoint of the leg between the first and second activated transducers and protrudes outward from the leg of the triangle. In this case, the line, L, is equal to the chord, C, in FIG. 3. In this case, the positions of the first transducer activated and the second activated transducer are 2 points on the circumference of the same circle that activated both transducers simultaneously. In this case, the 3-D position of the sound source and the course line of the sound source, can be solved using the process described below beginning at step 2.

Case 3. If t=T and 2 transducers are activated, then the signal source is on an extension of L outside the antenna array. The energy source may be moving in the direction towards L or away from L, but at the moment of activating 1 transducer the energy source is on an LOP which is generated by the extending line of L at the activated transducer.

Case 4. If all 3 transducers in the array are activated, this is an indication that the sound source may be inside the array, sector VII in FIG. 2, or either above or below the antenna array. This will result in, t, and $t_1$, and possibly $t_2$ being established. Determine the lengths of t, $t_1$, and $t_2$ using equation (2) and scribe an arc from the apexes of the $2^{nd}$, and $3^{rd}$, transducers activated. Where the arcs intersect marks the 2-dimensional position of the sound source. In Case 4, the 3-D position of the sound source and course line, can be solved using the process described below beginning at step 1.

Case 5. If t=0, then in this case only 1 transducer has been activated and the sound source is somewhere in the 2 adjacent sectors to the single activated transducer. Another triangular array should be established to detect a sound signal that will result in a transducer pair to be activated.

Figure 3:
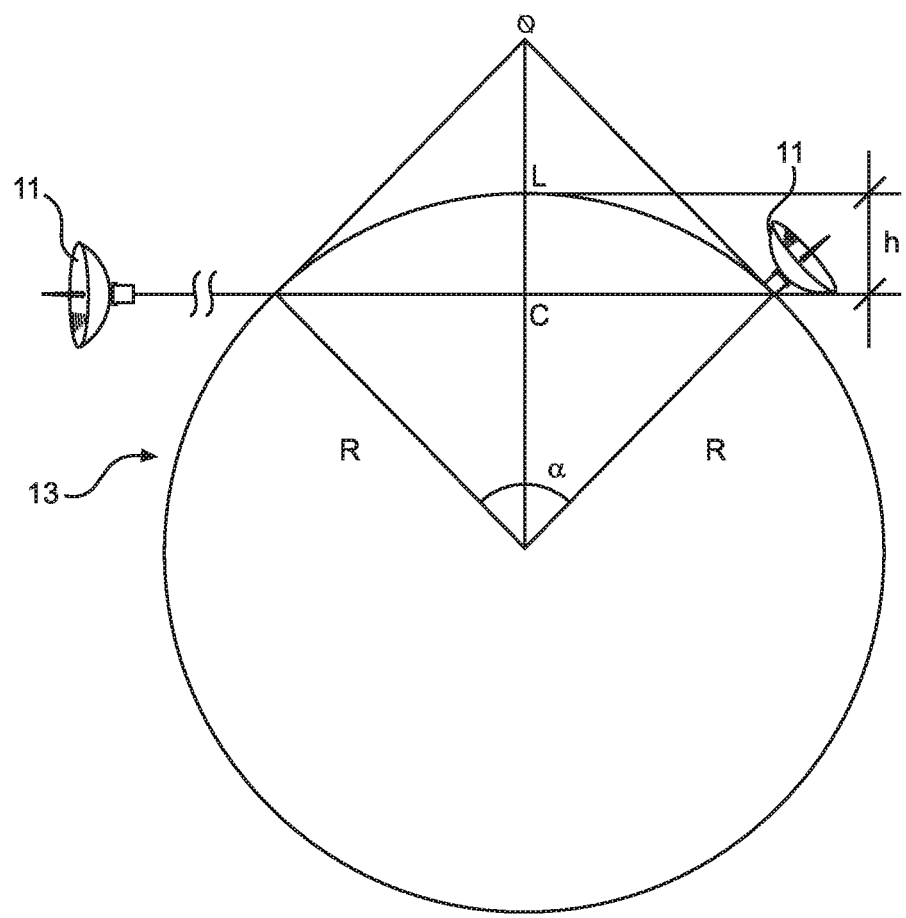
FIG. 3 is a diagrammatic view of a graphical tool to determine a chord line in a process for determining the 3-dimensional position of a signal source according to an exemplary embodiment.
Figure 4:
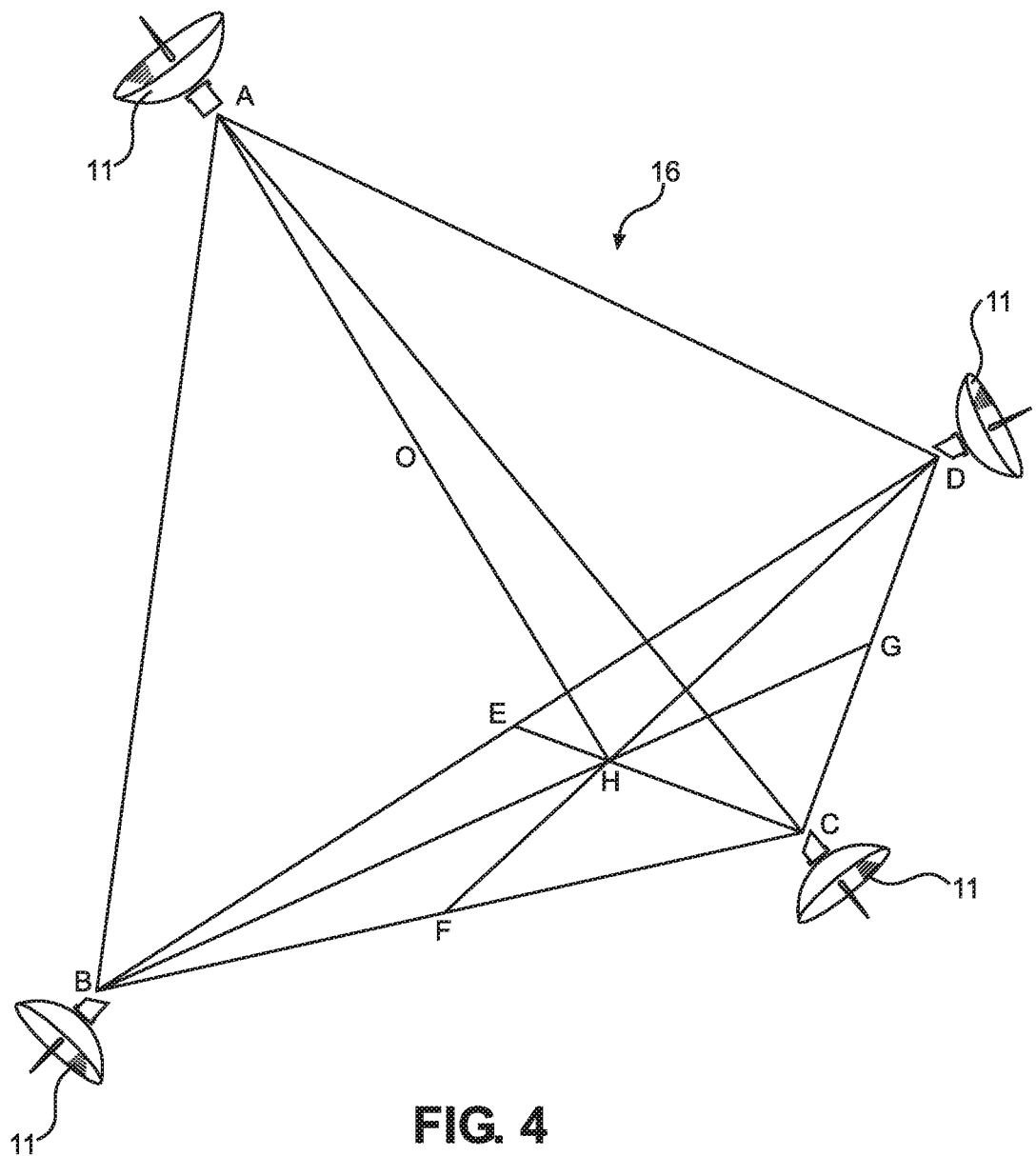
FIG. 4 is a perspective view of a system for determining the 3-dimensional position of a signal source according to another exemplary embodiment.

Note (1): In Case 1, the length, l, will end where it intersects with the circumference of the circle that is formed when sound source transmitted signal activates the second transducer. Using equation (2): l=t*V.

Where line Z intersects the circumference of the circle, it will be one endpoint on the chord, C, shown in FIG. 3. The other endpoint of the chord is the position of $1^{st}$ transducer activated.

Note (2): If t>T, at the $2^{nd}$ transducer after the $1^{st}$ transducer is activated, then there is an artifact interference that would indicate that the $2^{nd}$ transducer activated was the $1^{st}$ transducer activated; therefore, the above combinations in this note constitute a false positive.

Note (3): If 0<t>T, at the $2^{nd}$ transducer that normally would be activated if 0<t<T then a different signal may have activated the $2^{nd}$ transducer by a second sound source by an energy source nearby. This situation also constitutes a false positive.

A Process Embodiment

The entry angle of the energy source circle into the array is the course line of the center of the source of the transmitted energy circle relative to the spatial orientation of the array. This angle can be determined by a second activation of the same transducers, transducer #1 and transducer #2. This will determine the actual course of the energy source.

One part of the wave front energy created by the sound source that activated the $1^{st}$ transducer in Cases 1 and 4 will intercept L at a different point that will become the genesis of and will become the $2^{nd}$ position on the point on the circumference of the circle that was created by the arc between the $1^{st}$ transducer activated and the $2^{nd}$ position of the $2^{nd}$ point on the circumference of the circle. The variable l can be computed by using equation (2) starting at the apex of the $2^{nd}$ transducer and progressing down the leg of the triangle to the end of l. Whatever sector the end off lies in, then that is the sector where the energy source is located. The endpoint of Z and the position of the $1^{st}$ transducer activated are two different points on the circumference of the same circle; therefore, they can be connected by an arc and a circle can be fitted to the two points of the arc. A chord should be drawn between the point identified by the end of the $2^{nd}$ point on the circumference and the position of the $1^{st}$ transducer activated. The fitting of the complete circle can be completed by joining these two points with the arc of the circle and continuing along the circumference until a complete circle has been formed. The result is a complete circle of the energy at the time the $1^{st}$ transducer was activated.

The 3-dimensional position of the center of the radiating energy detected by the array 12, the course line of the moving center of the sound source 10 and the possibility of determining the speed of the center of the circle will be addressed in a step-by-step process later in this paper.

At both ends of the chord one line that is perpendicular to the circumference of the circle and progress inwards toward the center of the circle define radii that will intersect at the center of the circle. Measure the length of both radii. The chord can be either measured or calculated by equation (7). Since each radius is equal to the other, and the length of C has already been determined, these parameters are the 3 parameters that will be entered as the parameters into the Law of Cosines to calculate the angle a using equation (3). The outcome of the calculation will be in radians. The angle a can be converted to degrees by equation (4). The angle a can also be computed by equation (6). Equation (6), C=2*radius*sin(a/2), where the length of 1 radii is needed and obtained by measurement, and the length of C is needed and obtained by calculation or measurement. Once the angle a is known in radians, or is not needed as in the example of Case 2, where the radiuses are a straight line that describes the diameter of the circle and there is no angle a. The apex of angle a is the 2-dimensional position of the energy source. The 2-dimensional position of the signal source is at the midpoint of C in Case 2. Otherwise, the 2-dimensional position of the signal source is located at the apex of angle a. In order to get the 3-dimensional position, the vertical portion of the antenna array must have the same interaction of the energy detection as its horizontal components. One vertical leg in the XZ or YZ plane can then form a circle and the center of that circle is the position of the energy source on the Z axis.

In Case 1 and Case 4, the points where both ends of the chord line intersects the circumference of the circle draw tangential lines in the direction towards the inside of the array. These 2 lines will intersect somewhere in the direction of the array and they will form an isosceles triangle with the chord line. Measure both tangential lines to determine that they are equal. The length of the chord, C and the lengths of the 2 legs form an isosceles triangle and are the 3 parameters needed to enter equation (3) to calculate the angle, Φ, at the apex of the 2 sides of the isosceles triangle. The angle Φ will be in radians. Use equation (4) to change the radians to degrees. Draw and measure a line from a/2 to Φ/2. This line is the course line of the center of the circle, the signal source.

The process will use the following equations:
Equation (1), used to solve the length of the constant L.
Equation (2), used to solve the length of the variable l.
Equation (3), the law of cosines equation: $C^2=A^2+B^2-2*A*B*\cos(\Omega)$
Equation (4), the conversion of radians to degrees: degrees=radians*(180/pi)
Equation (5), the Pythagorean Theorem: $Z^2=(Hypotenuse)^2-(Base)^2$
Equation (6), C=2*radius*sin(a/2), where the length of 1 radii is needed and obtained by measurement, and the length of C is needed and obtained by calculation once the angle a is known in radians or is known in the example of Case 2.

$$C=L-l. \qquad \text{Equation (7)},$$

Step 1. In Cases 1 and 4, establish the endpoint of l on the triangle leg as its transverses the length of L from the apex of the $2^{nd}$ transducer activated towards the position of the $1^{st}$ transducer activated. The position of the 1$^{st}$ transducer activated and the 2$^{nd}$ position at the endpoint of l are 2 points that lie on the circumference of the same circle and form a chord that connects the 2 points. They are to be joined together by an arc to complete a section of the circle that produced the energy. Continue the line along the circumference of the circle until the complete circle has been formed. Skip to step 3.

In step 2, in Case 2, the endpoints of the chord are where they intersect the circumference at both ends of L at the positions of the 1$^{st}$ transducer activated and 2$^{nd}$ transducer activated. In this case, the length of C=L.

In step 3, for Cases 1 and 4, create a chord, C, by drawing a line between the endpoint of l and the position of the 1$^{st}$ transducer activated. The length of the chord, C, can be calculated by equation (7) or measured. At both ends of C draw lines that are perpendicular to the circumference and proceed inwards to meet at the center of the circle. They are 2 radiuses of the same circle. Where the 2 lines intersect, they form angle a, shown in FIG. 3. The length of C can be calculated by equation (7) and the length of the radius can be measured, then the magnitude in degrees of angle a can be determined by equations (3) then (4).

In step 4, the position of the angle a is the 2-dimensional position of the sound source. For Cases 1, and 4, draw a line from each of the 2 endpoints of C on the circumference of the circle that is created by the signal source that are tangential to the circle. These lines will begin at the bases of the perpendicular lines that determined the radiuses. These new lines are tangential to the circumference and proceed outwards to meet at a point ahead of the circle. In Cases 1 and 4 where the 2 lines intersect, they form angle Φ. The length of these 2 lines are equal and together with the chord, C, they form an isosceles triangle. The lengths of the lines can be measured and the chord, C, can be calculated, then the angle Φ can be determined by equation (3) and then (4). In Case 2, the point Φ is determined to be at the midpoint of C and is the 2-dimension position of the energy source.

In step 5, at a point located at the a/2 apex, draw a line that intersects the line C at its midpoint and continues to terminate at the point of Φ/2 at the apex of the 2 tangential lines. This line is the course line of the movement of the sound source. In case 2, the midpoint of C instead of Φ/2.

In step 6, to get the 3-dimensional position, the image becomes 3 dimensional, (X,Y,Z). The center of the circle has already been determined as the 2-dimensional position of the energy source; therefore, (X,Y,Z) becomes (0,0,Z). The line from the mid-point of C to where it intersects the circumference laterally from C will be the base of a right triangle and its length is known. The hypotenuse is the length of one of the tangential lines; therefore, the length of the course line from the midpoint of C to the apex of the angle Φ can be calculated using the Pythagorean theorem, equation (5). In case 2, the course line is an extension of the midpoint of C into the antenna. The entire length of the course line can be calculated by adding the length of a line from the center of the circle to the midpoint of C to the previous results. The distance line from the midpoint of the antenna to the apex of angle a is the long leg of a right triangle and it can be measured. The line from the apex of angle a to the center of the vertical circle is the hypotenuse and it can be measured. The length of the remaining leg on Z and can be calculated by the Pythagorean Theorem equation (5). The length of +/−Z is the result of the Pythagorean Theorem. In case 2, the base leg of the right triangle is C/2, and the long leg (Z) is from the midpoint of C vertically to the center of the circle that has been established by activation of one of the vertical legs, either XZ or YZ. Then the hypotenuse is the line beginning at the point on the point where the line C/2 intersects the circumference of the circle. The line ends at the center of the circle on the Z axis. This line can be measured. The length of the long leg on the Z axis can computed by the Pythagorean Theorem. The 3 legs of the triangle are the parameters are the values of (X,Y,Z) and the 3-dimensional position has been determined for case 2.

The explanation for how the 3-dimensional position and the course line of the signal can be determined, and how to determine the speed of a sound source has been completed.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A process for determining a three-dimensional position of an energy source, comprising:

receiving, at a processor, an energy signal provided by an object travelling relative to a plurality of transducers positioned in an equilateral triangular arrangement, wherein seven sectors are defined by positions between the plurality of transducers, wherein six of the seven sectors are areas external to the equilateral triangular arrangement and defined by bi-sections of the legs of the equilateral triangular arrangement, and one sector is positioned inside an area of the equilateral triangular arrangement;

receiving a first detection signal from a first transducer;

receiving a second detection signal from a second transducer;

determining by the processor, an elapsed time difference of receiving the energy signal by the first transducer and the second transducer;

determining by the processor a distance between the first transducer and the second transducer;

determining by the processor, a case scenario for where the energy source is relative to the triangular arrangement based on the determined elapsed time difference, wherein the case scenario represents the object being present in one of the seven sectors;

calculating by the processor a section of the distance between the first transducer and the second transducer;

calculating by the processor a chord based on either the distance between the first transducer and the second transducer or the section of the distance between the first transducer and the second transducer;

plotting by the processor, a circle based on the chord, wherein the circle represents a two-dimensional position of the object;

plotting, by the processor, a first line from a first end of the chord and a second line from a second end of the chord to a center of the circle;

determining by the processor an intersection of the first line and the second line at the center of the circle;

determining by the processor, a magnitude of an angle of the intersection of the first line and the second line at the center of the circle; and determining by the processor, using the Pythagorean theorem, a three-dimensional position of the object, wherein a third line from a midpoint of the chord to an intersection with the circle is a base, and a hypotenuse is one of either the first line or the second line.

2. The process of claim 1, further comprising determining whether the three-dimensional position of the object is upward or downward from a plane of a wave front of the energy signal.

3. A system for determining a three-dimensional position of an energy source by a plurality of transducers, comprising:
- a plurality of receiving transducers arranged in an equilateral triangle, wherein seven sectors are defined by positions between the plurality of transducers, wherein six of the seven sectors are areas external to the equilateral triangular arrangement and defined by bi-sections of the legs of the equilateral triangular arrangement, and one sector is positioned inside an area of the equilateral triangular arrangement; and
- a processor in communication with the plurality of receiving transducers, wherein the processor is configured to:
  - receive, at the processor, an energy signal provided by an object travelling relative to the plurality of transducers;
  - receive a first detection signal from a first transducer;
  - receive a second detection signal from a second transducer;
  - determine by the processor, an elapsed time difference of receiving the energy signal by the first transducer and the second transducer;
  - determine by the processor a distance between the first transducer and the second transducer;
  - determine by the processor, a case scenario for where the energy source is relative to the triangular arrangement based on the determined elapsed time difference, wherein the case scenario represents the object being present in one of the seven sectors;
  - calculate by the processor a section of the distance between the first transducer and the second transducer;
  - calculate by the processor a chord based on either the distance between the first transducer and the second transducer or the section of the distance between the first transducer and the second transducer;
  - plot by the processor, a circle based on the chord, wherein the circle represents a two-dimensional position of the object;
  - determine by the processor an intersection of the first line and the second line at the center of the circle;
  - determine by the processor, a magnitude of an angle of the intersection of the first line and the second line at the center of the circle; and
  - determine by the processor, using the Pythagorean theorem, a three-dimensional position of the object, wherein a third line from a midpoint of the chord to an intersection with the circle is a base, and a hypotenuse is one of either the first line or the second line.

4. The system of claim 3, wherein the processor is further configured to determine whether the three-dimensional position of the object is upward or downward from a plane of a wave front of the energy signal.

* * * * *